Oct. 18, 1927.
A. PALMIGIANO, JR
1,645,924
TREE FELLING SAW
Filed Dec. 16, 1926
3 Sheets-Sheet 3
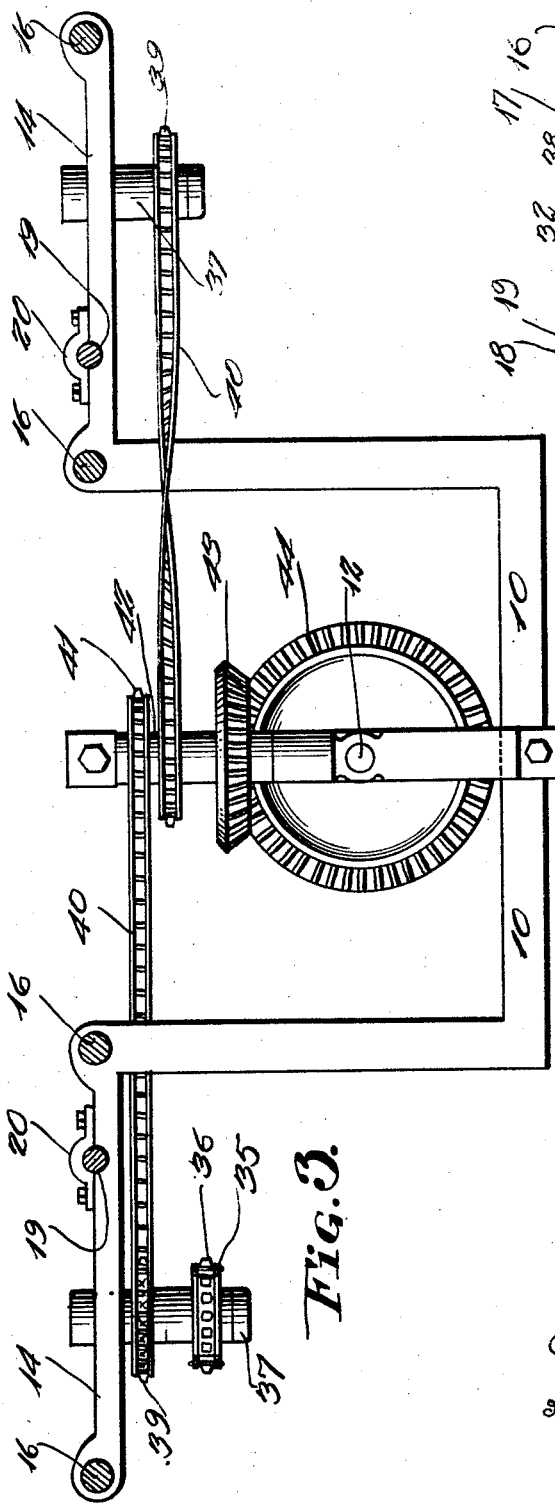
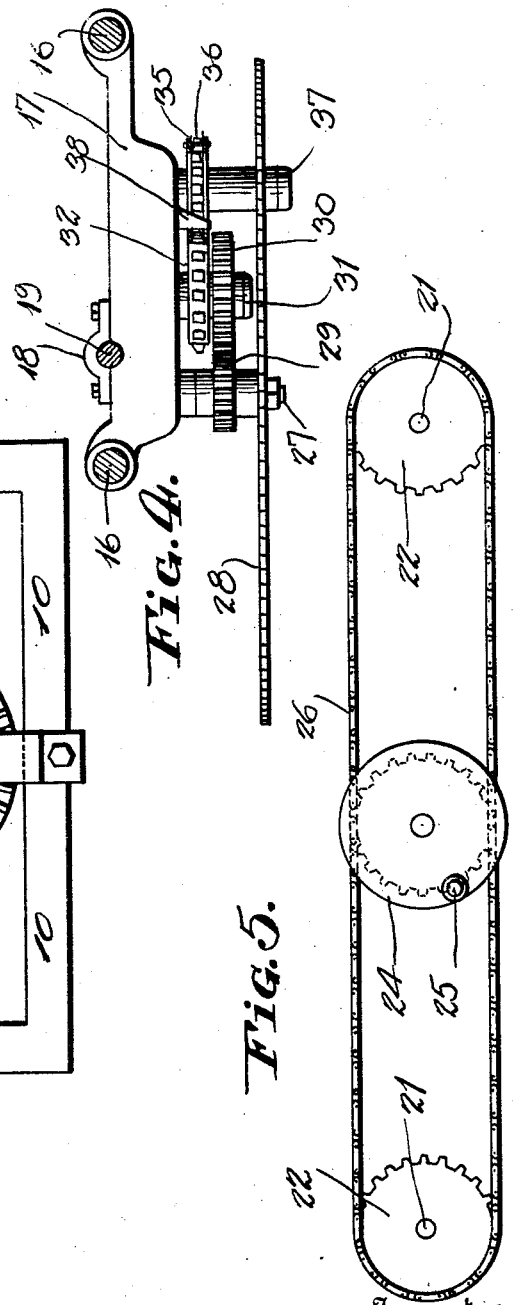
Inventor
Anthony Palmigiano Jr.
By L. N. Gulli
Attorney Patented Oct. 18, 1927.

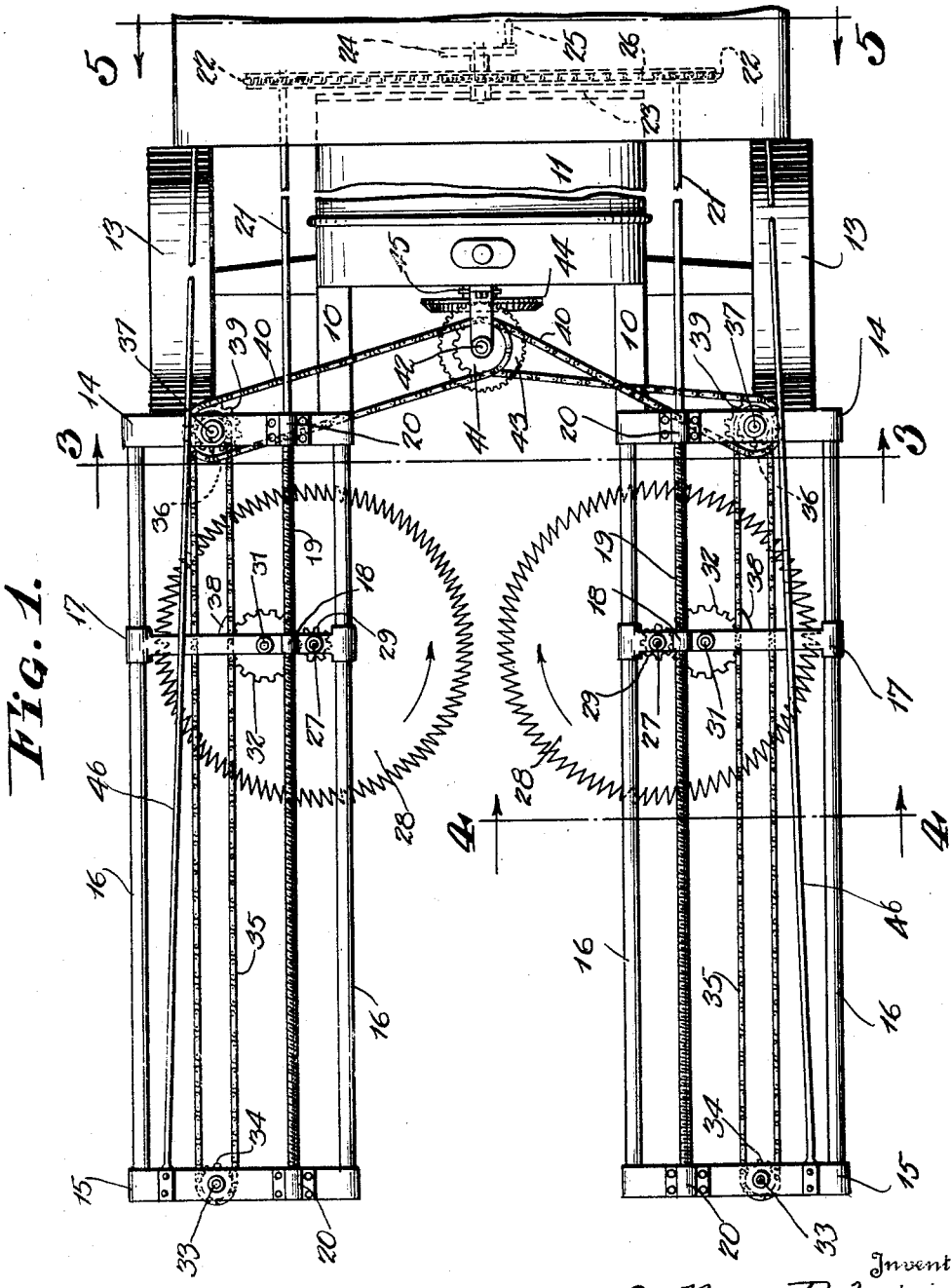

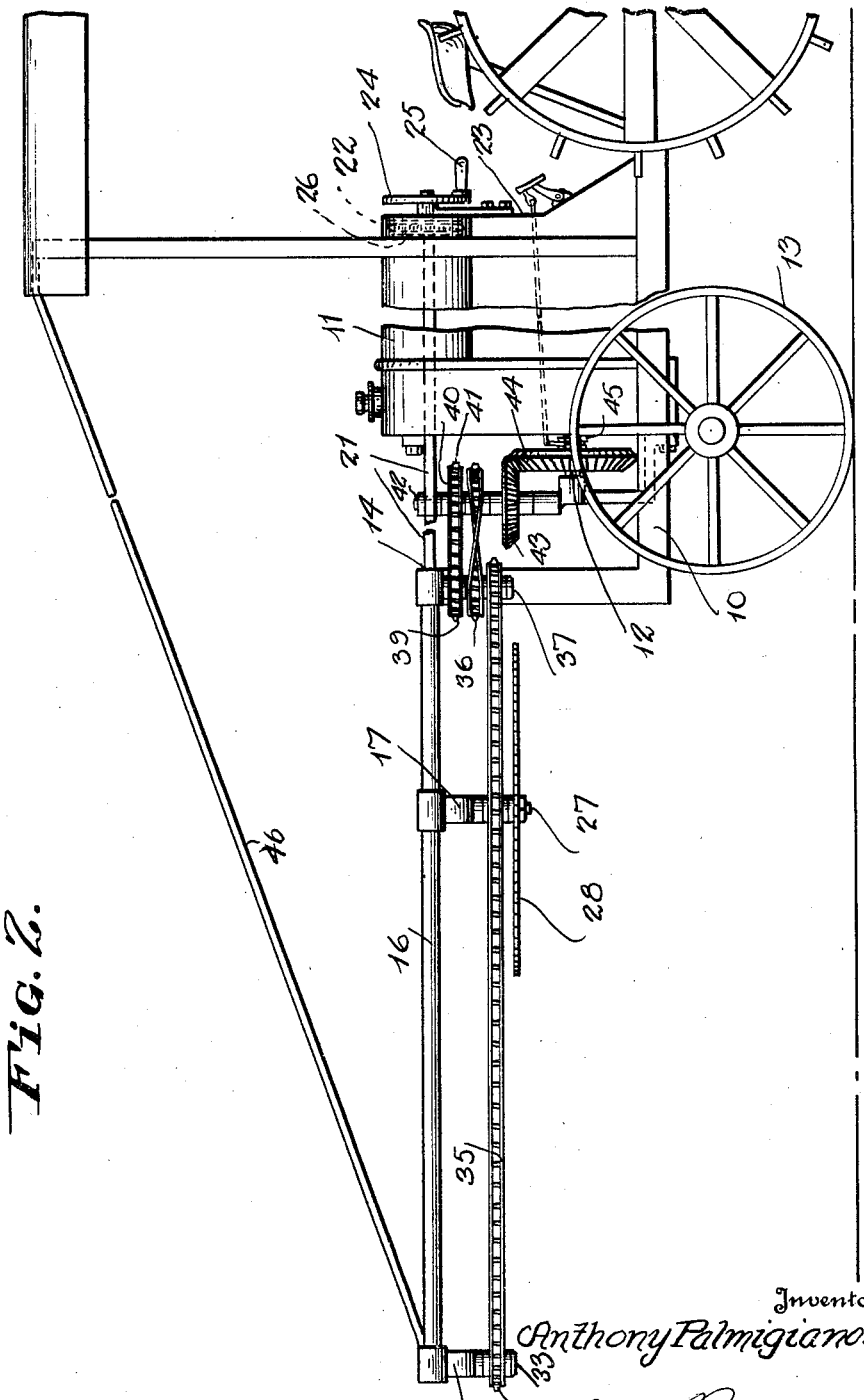

1,645,924

UNITED STATES PATENT OFFICE.

ANTHONY PALMIGIANO, JR., OF BROOKLYN, NEW YORK.

TREE-FELLING SAW.

Application filed December 16, 1926. Serial No. 155,255.

This invention relates to lumbering and has special reference to a tree felling saw.

One important object of the invention is to improve the general construction of a device of this character.

A second important object of the invention is to provide an improved device of this character wherein the tree can be cut on both sides at once.

A third important object of the invention is to provide a novel arrangement of motor truck supported saw wherein a pair of saws can be simultaneously operated on both sides of a tree.

A fourth object of the invention is to provide novel means for feeding such saws forwardly in unison.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a plan view of the improved device.

Figure 2 is a side elevation thereof.

Figure 3 is an enlarged detail section on the line 3—3 of Figure 1.

Figure 4 is a similar section on the line 4—4 of Figure 1.

Figure 5 is a similar section on the line 5—5 of Figure 1.

In the embodiment of the invention herein illustrated there is disclosed the front end of a motor driven truck having side frame members 10 and this truck has the usual engine located beneath the housing 11, the crank shaft of the truck projecting forwardly of the housing as at 12. The forward end of the truck is supported by wheels 13 having wide tires to prevent this end from sinking into the ground.

Projecting forwardly from each side of the truck and spaced from each other are the frames which carry the saws. These frames each include a rear frame member 14 and a front frame member 15 which are connected by longitudinally extending bars or rods 16. Slidably mounted on each pair of the bars or rods is a carriage 17 and each of these carriages is provided with a feed nut 18 through which passes a feed screw 19 journalled in bearings 20 supported by the front and rear frame members. These feed screws terminate rearwardly in shafts 21 and on each of these shafts is mounted a sprocket 22. On the dash 23 of the motor is revolubly mounted an operator's feed wheel 24 in the form of a sprocket and having a handle 25 by means of which it may be rotated on its shaft. Extending around this feed wheel and around the sprockets 22 is a sprocket chain 26 by means of which the operator's wheel 24 is connected to the feed screws 19 so that rotation of the wheel 24 rotates both screws 19 to feed the carriages 17 simultaneously in the same direction. Journalled on each of these carriages is a shaft 27 whereon is mounted a saw 28, these saws lying in the same plane and preferably having parallel and vertical axes. Furthermore, on each saw shaft 27 is mounted a gear 29 wherewith meshes a gear 30 fixed on a shaft 31 supported for rotation on a respective carriage. Also on each shaft 31 is a sprocket 32. Mounted on a stub shaft 33 at the front of each frame is an idler sprocket 34 which is connected by an endless sprocket chain 35 with an idler sprocket 36 fixed on a shaft 37 journalled in the rear member of the respective frame. The chain 35 for each frame engages the respective sprocket 32 and is held in such engagement by a chain guide 38 carried on the respective carriage. Also on each shaft 37 is a second sprocket as at 39 and each of these sprockets 39 is connected by a chain 40 with a driving sprocket 41, these latter being mounted on a driving shaft 42 suitably supported for rotation at the front of the truck. On the shaft 42 is also provided a bevel gear 43 wherewith meshes a bevel gear 44 mounted on the crank shaft 12 and arranged to be clutched to or released from said crank shaft by a suitable clutch mechanism 45 controlled by the operator.

In using the machine the truck is driven up to a suitable position so that the frames straddle the tree which is to be felled, the center of the truck being aligned as nearly as may be with such tree. The operator then stops the truck while leaving the engine running by releasing the usual clutch between the motor and the propeller shaft and throws in the clutch 45. He then rotates the feed wheel 24 so as to bring the rapidly revolving saws into engagement with the tree and feeds them through the tree or as far through as he desires. When the tree has been cut sufficiently far the saws are withdrawn and the truck backed away after which the usual wedges are driven in and the tree felled. Of course, the operation may be repeated with other trees as many times as desired.

Brace rods 46 extend from the forward ends of the frames to the upper part of the driver's cab, this being made strong enough for the purpose, and serving to support the forward ends of the frames against vibration and jerking up and down.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. A tree felling device including a pair of spaced frames adapted to be carried on a truck, a pair of carriages each mounted on a respective frame for forward and backward movement on the frame, nuts each carried by a respective carriage, feed screws journalled on said frames and passing through said nuts, an operator's feed wheel, gearing connecting both feed screws to said feed wheel, saws each revolubly mounted on a respective carriage, and means to drive said saws in unison.

2. A tree felling device including a pair of spaced frames adapted to be carried on a truck, a pair of carriages each mounted on a respective frame for forward and backward movement on the frame, nuts each carried by a respective carriage, feed screws journalled on said frames and passing through said nuts, a sprocket mounted for rotation adjacent the rear of said frames, other sprockets each fixed to a respective screw, a sprocket chain connecting the said sprockets, saws each revolubly mounted on a repective carriage, and means to drive said saws in unison.

3. A tree felling device including a pair of spaced frames adapted to be carried on a truck, a pair of carriages each mounted on a respective frame for forward and backward movement on the frame, nuts each carried by a respective carriage, feed screws journalled on said frames and passing through said nuts, means to drive said screws in unison, saws each revolubly mounted on a respective carriage, gear trains each mounted on a respective carriage for driving the saw carried thereby and including a sprocket wheel, sprocket idlers at the respective ends of said frames, sprocket chains each running around the idlers of a respective frame and engaging the sprocket wheel of the gear train, and means to drive said sprocket chains.

4. A tree felling device including a pair of spaced frames adapted to be carried on a truck, a pair of carriages each mounted on a respective frame for forward and backward movement on the frame, nuts each carried by a respective carriage, feed screws journalled on said frames and passing through said nuts, means to drive said screws in unison, saws each revolubly mounted on a respective carriage, gear trains each mounted on a respective carriage for driving the saw carried thereby and including a sprocket wheel, sprocket idlers at the respective ends of said frames, sprocket chains each running around the idlers of a respective frame and engaging the sprocket wheel of the gear train, the rear idler of each frame having a shaft on which it is fixedly mounted, a second sprocket on each of said shafts, a driving shaft, a pair of sprockets fixed on said driving shaft, sprocket chains operatively connecting the pair of sprockets with the second sprockets on the shafts, and means to drive the driving shaft.

5. A tree felling device including a pair of spaced frames adapted to be carried on a truck, a pair of carriages each mounted on a respective frame for forward and backward movement on the frame, nuts each carried by a respective carriage, feed screws journalled on said frames and passing through said nuts, an operator's feed wheel, gearing connecting both feed screws to said feed wheel, saws each revolubly mounted on a respective carriage, gear trains each mounted on a respective carriage for driving the saw carried thereby and including a sprocket wheel, sprocket idlers at the respective ends of said frames, sprocket chains each running around the idlers of a respective frame and engaging the sprocket wheel of the gear train, and means to drive said sprocket chains.

6. A tree felling device including a pair of spaced frames adapted to be carried on a truck, a pair of carriages each mounted on a respective frame for forward and backward movement on the frame, nuts each carried by a respective carriage, feed screws journalled on said frames and passing through said nuts, an operator's feed wheel, gearing connecting both feed screws to said feed wheel, saws each revolubly mounted on a respective carriage, gear trains each mounted on a respective carriage for driving the saw carried thereby and including a sprocket wheel, sprocket idlers at the respective ends of said frames, sprocket chains each running around the idlers of a respective frame and engaging the sprocket wheel of the gear train, the rear idler of each frame having a shaft on which it is fixedly mounted, a second sprocket on each of said shafts, a driving shaft, a pair of sprockets fixed on said driving shaft, sprocket chains operatively connecting the pair of sprockets with the second sprockets on the shafts, and means to drive the driving shaft.

In testimony whereof I affix my signature.

ANTHONY PALMIGIANO, Jr.